Feb. 4, 1958
F. S. BUCKINGHAM
2,822,095
WEIGHING APPARATUS FOR LIFTING EQUIPMENT
Filed Sept. 19, 1955
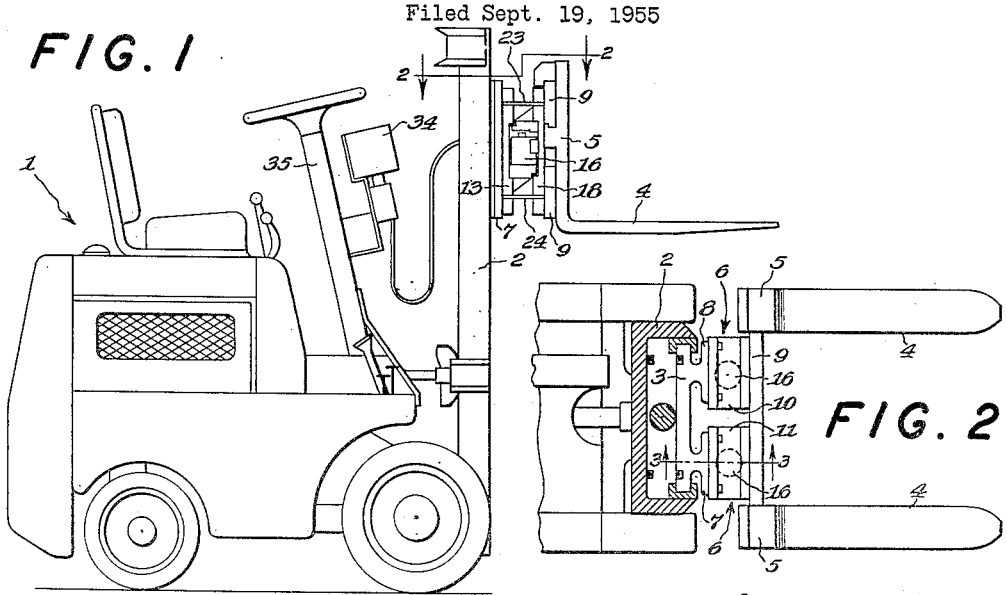
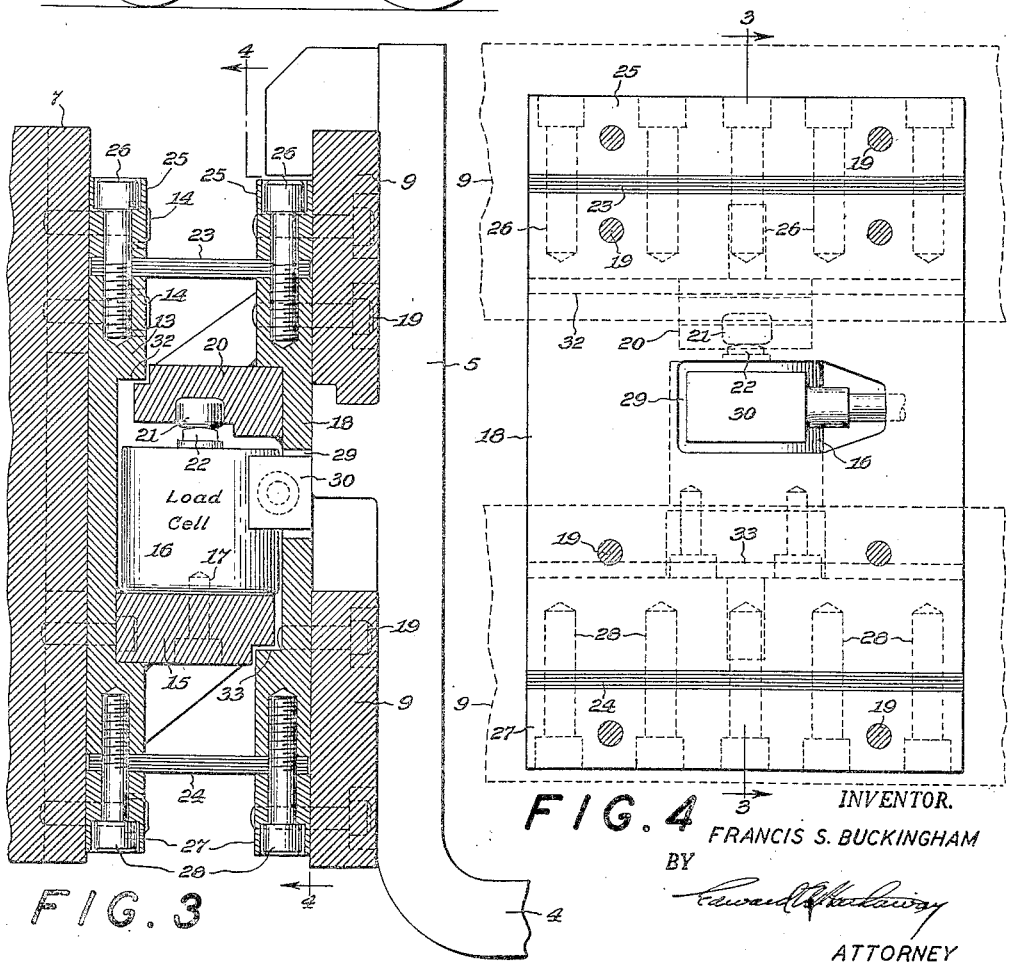
INVENTOR.
FRANCIS S. BUCKINGHAM
BY
*Edward C. Hathaway*
ATTORNEY United States Patent Office 2,822,095
Patented Feb. 4, 1958

2,822,095

WEIGHING APPARATUS FOR LIFTING EQUIPMENT

Francis S. Buckingham, Franklinville, N. J., assignor to Baldwin-Lima-Hamilton Corporation, a corporation of Pennsylvania Application September 19, 1955, Serial No. 535,093

2 Claims. (Cl. 214—2)

This invention relates generally to lifting mechanisms having apparatus for weighing lifted loads and more particularly for weighing loads on fork-lift trucks.

Fork-lift type trucks are widely used, as is well known, in industrial plants but the overhanging cantilever nature of the lifting forks, as well as the frequently rough manner of loading and unloading the fork-lift, produces extremely difficult and complicated loading forces upon the lifting mechanism and supporting structure, thus requiring the same to be very rugged. Such equipment must also be compact in order to facilitate maneuverability of the truck. Such conditions have made it very difficult to weigh loads on the lifting forks by any suitable weighing mechanism that would have a high degree of accuracy and sensitivity combined with the necessary ruggedness to withstand the cantilever load on the forks and the rough manner of loading and unloading the forks.

It is an object of my invention to provide an improved weighing mechanism for fork-lift trucks adapted to have a high degree of accuracy and sensitivity and to allow the weighing unit to be incorporated in the truck as a self-contained part thereof so as to obtain compactness, ruggedness and durability without limiting the flexibility of operation of the lifting forks or the maneuverability of the truck.

A further object is to provide in a fork-lift type of truck an improved weighing apparatus that allows an electrically responsive load weighing cell to be effectively employed.

Another object is to provide an improved fork-lift truck weighing mechanism that is relatively simple and economical in construction, operation and maintenance and which is readily accessible for inspection and repair.

Other objects and advantages will be more apparent to those skilled in the art from the following description of the accompanying drawings in which:

Fig. 1 is a side elevation of a conventional fork-lift truck employing my improved weighing mechanism;

Fig. 2 is a fragmentary sectional plan view taken substantially on the line 2—2 of Fig. 1;

Fig. 3 is a section taken generally on the lines 3—3 of Figs. 2 and 4 showing one of the plurality of weighing units which form an integral part of the vertically movable lifting structure; and Fig. 4 is a vertical transverse section taken substantially on the line 4—4 of Fig. 3 to show a weighing unit with the structure for connecting the weighing unit to the lifting forks removed.

My invention may be employed in any fork-lift type truck, one form of which is conventionally shown at 1, having a usual vertical guiding frame 2 in which a vertically movable crosshead 3 is guided. The forks 4 are connected through their vertical upright portions 5 to this crosshead 3. The crosshead 3 is moved vertically with any usual mechanism such as a hydraulic ram and chains well known in the art and hence this need not be described as it forms no part of my present invention.

It will suffice to describe only my particular weighing mechanism and the related lifting structure. The weighing mechanism is generally indicated at 6 and, in the specific embodiment of the invention, is disposed between the crosshead 3 and the fork structure so as to constitute an integral part of the lifting fork and crosshead. The crosshead 3 is shown, Fig. 2, as having two forwardly projecting supports 7 and 8 which heretofore have been secured to a pair of upper and lower crossbars 9 connecting the upright fork elements 5. However, I separate these supports and cross bars by a small distance and insert therein my weighing mechanism which is specifically shown for purposes of illustration as comprising two laterally spaced weighing units generally indicated at 10 and 11 disposed preferably side by side and in the same horizontal plane although it will be understood that the number of weighing units may be more or less depending upon the load capacity.

Inasmuch as these weighing units are identical, the description of one will suffice. The weighing units, as shown in Figs. 3 and 4, comprise a plate 13 secured by bolts 14 to the crosshead projection 7 and having a base or platform 15 upon which a load weighing cell 16 is supported and secured thereto by a cap screw 17. A plate 18, generally similar to plate 13, but in an inverted position, is secured by bolts 19 to the cross connecting member 9 of the forks. The member 18 has a load transmitting ledge portion 20 provided with a hardened insert 21 for abutting engagement with load sensing element 22 of the load cell 16, the portions 15 and 20 being in vertically opposed relation to each other. In order to maintain the plates 13 and 18 parallel to each other during relative vertical movement between elements 15 and 20 in response to load applied to the forks, and to provide an extremely rugged construction to withstand loading and unloading impacts without affecting the load cell 16, I provide upper and lower guide means such as flexure stay plate means 23 and 24 which, as shown in Fig. 4, extend for the full width of the members 13 and 18. These stay plates have thin flexible sections to allow free vertical movement of member 18 relative to member 13 and are shown herein as consisting preferably of a plurality of thin plates slightly spaced apart but held together as a unit by being clamped to the members 13 and 18 by upper clamping bars 25 and bolts 26 and similar elements 27 and 28 for the lower stay plates 24. The plate 18, Fig. 3, has an opening 29 through which an electrical connector box 30 extends forming a part of the load cell 16. As a matter of safety, excessive movement of member 18 is limited, either up or down, by having portions of members 15 and 20 overlap shoulders 32 and 33 of plates 13 and 18 and be slightly spaced from such shoulders to permit normal loading movement of the plate 18.

The load cell 16 may be of any suitable type adapted to be interposed between the members 15 and 20 but an electrically load responsive cell is particularly adapted as an element of my improved combination. Electrical load cells are well known in the art particularly those of the electrical resistance type, such as shown by way of example, but not of illustration, in Ruge Patents No. 2,472,047 and 2,576,417. In such cells the load deforms a load sensitive column to which resistance strain gages are secured so that their resistance varies in proportion to the load whereby by measuring this resistance change by any suitable electrically connected instrument 34, well known in the art and conveniently mounted on the steering wheel post 35 of the truck, it is possible for the operator to observe the indication of the load weight being lifted.

From the foregoing disclosure it is seen that I have provided a very simple, rugged and sensitive combination of elements for accurately weighing loads on laterally extending load supporting means, which is usually in the form of a fork, while at the same time obtaining a high degree of compactness so as to avoid limiting the maneuverability of the truck or the flexibility of general operation in any way. The flexure plates 23 and 24 with their pivotal action insure that the load forces will be adequately transmitted to the load cell to obtain axial loading of the sensitive column and will prevent injury to the cell in the event of the truck operator causing the vertical uprights 5 to hit against the load as is normally done in operation. Also, these flexure plates adequately resist the large cantilever load on the fork while the length of the flexure plates extending substantially across the entire width of the crosshead 3 makes the structure extremely stable in the event of unequal loading on the forks. Such unequal loading is also taken care of by using a plurality of load cells spaced laterally of each other along the length of the crosshead, i. e. in a direction crosswise of the fork. The cells are electrically connected together in a manner well known to average the load on the two cells.

It will, of course, be understood that various changes in details of construction and arrangement of parts may be made by those skilled in the art without departing from the spirit of the invention as set forth in the appended claims.

I claim:

1. The combination in a fork-lift truck, comprising, a load lifting mechanism having a vertically movable crosshead, a fork for supporting a load to be lifted, flexure stay means for connecting the crosshead to said fork so that the same are held in substantially rigid relation in a horizontal plane but allowed to have movement relative to each other in a vertical plane, said flexure stay means including a series of thin plates placed above each other and means for rigidly attaching the edge portions of the opposite ends of said plates to the crosshead and to the fork, and load weighing means operatively connected to said crosshead and to said fork so as to be operated in response to relative vertical movement upon lifting of a load.

2. The combination set forth in claim 1 further characterized in that the means for rigidly attaching the edge portions of the plates comprises means for clamping together the edge portions of the series of plates, and means for connecting the clamping means to the crosshead and to the fork.

References Cited in the file of this patent

UNITED STATES PATENTS

| | | |
|---|---|---|
| 2,590,626 | Jones | Mar. 25, 1952 |
| 2,643,781 | Wise | June 30, 1953 |
| 2,699,932 | Knobel | Jan. 18, 1955 |